March 13, 1973 V. W. KIMBLE 3,720,569
ENDLESS REINFORCEMENT AND METHOD FOR PRODUCING SAME
Filed Dec. 14, 1970 3 Sheets-Sheet 2
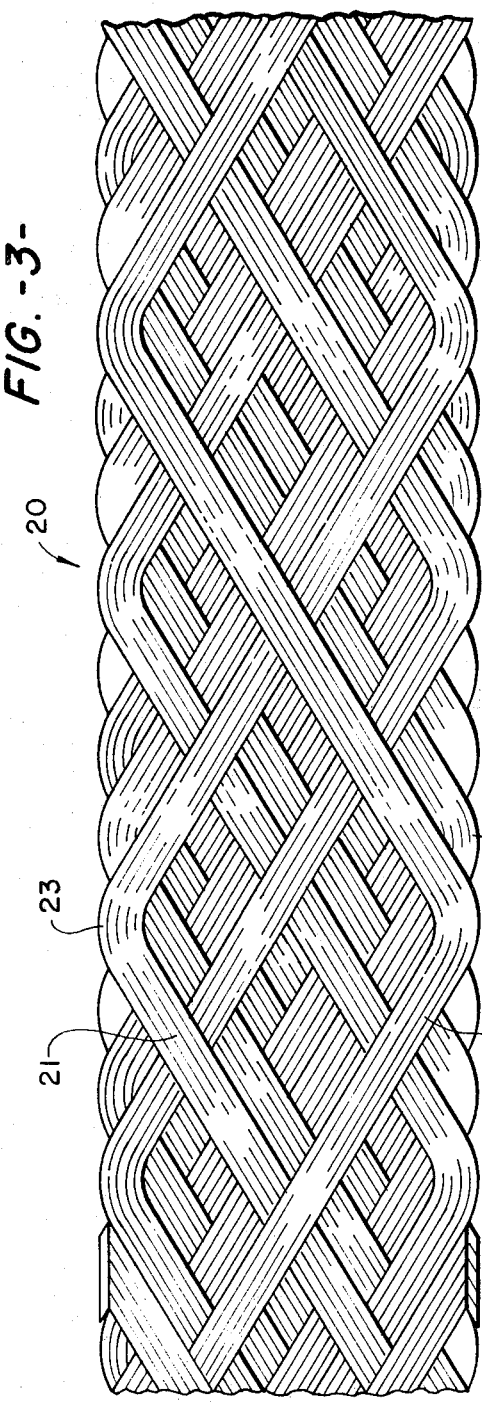
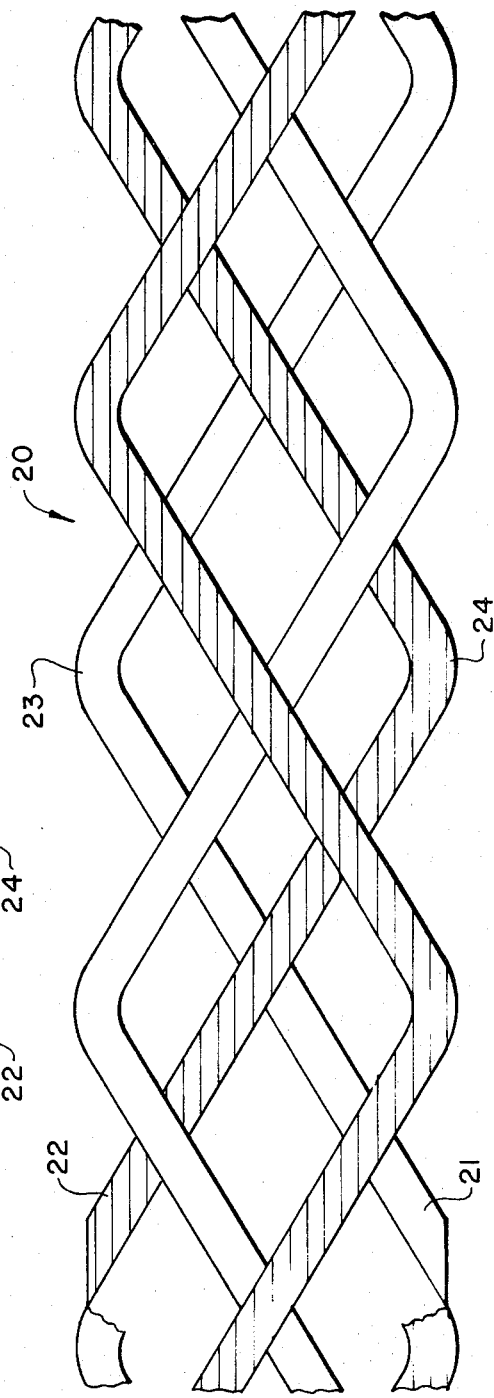
INVENTOR.
VICTOR W. KIMBLE
ATTORNEY

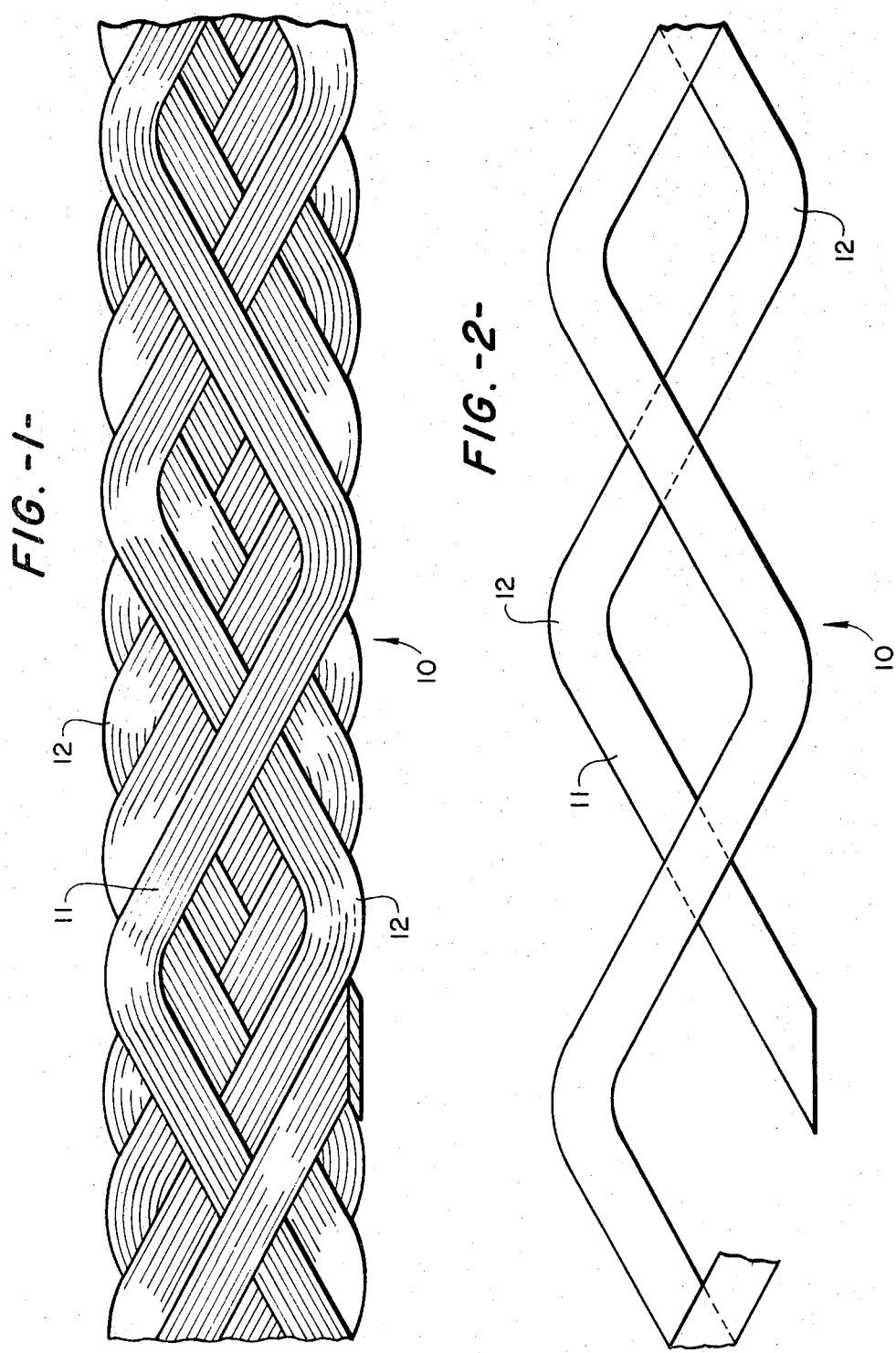

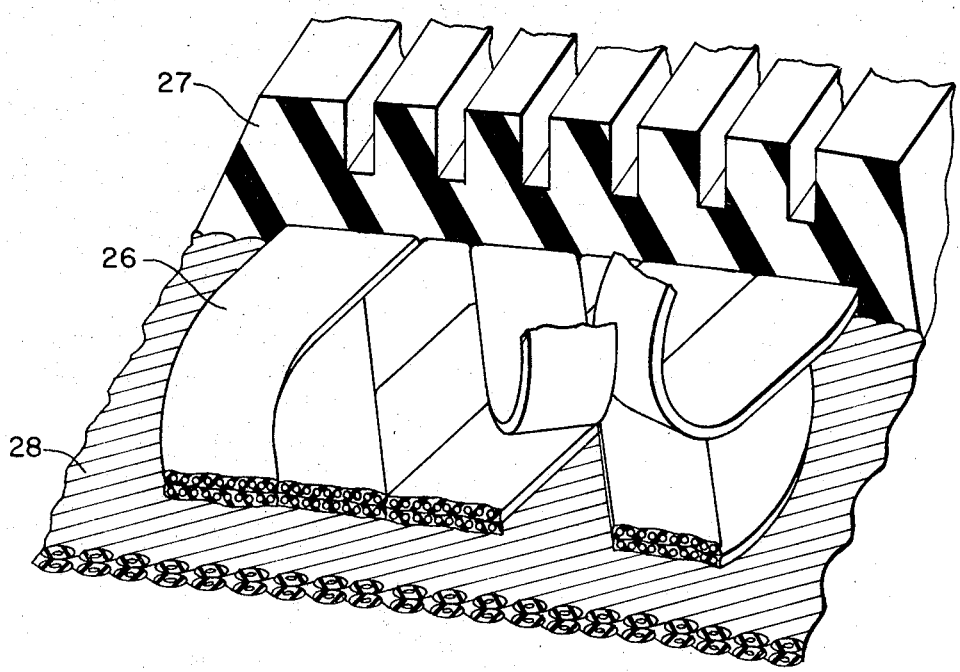
FIG. -5-
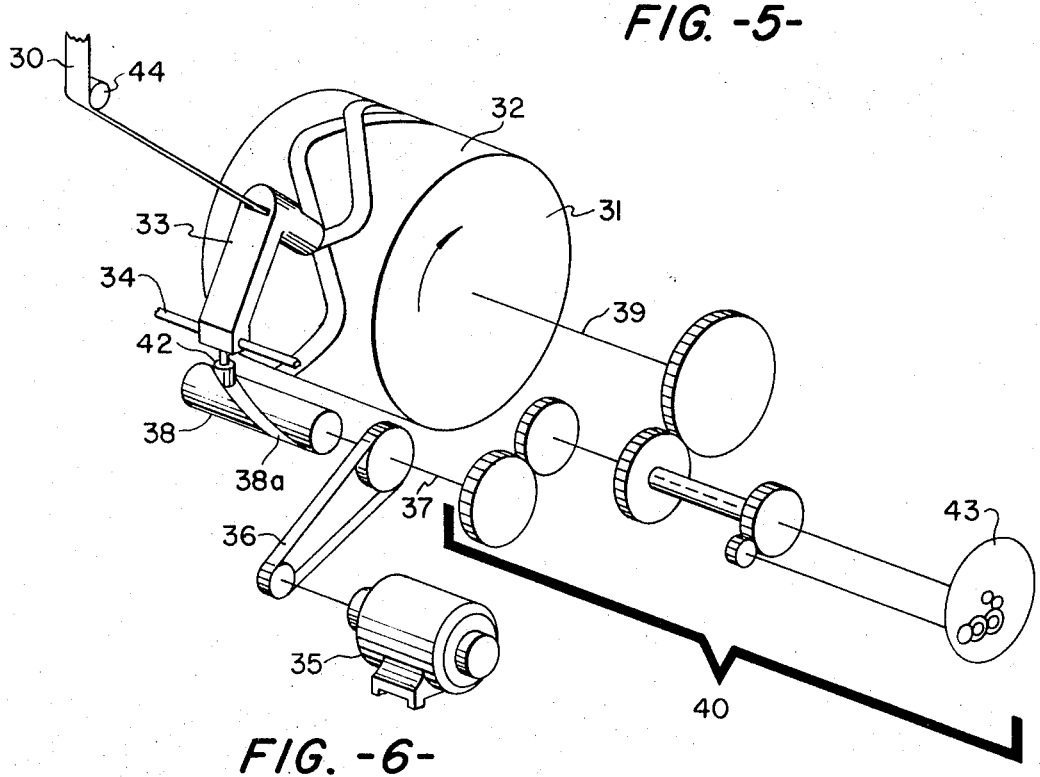
FIG. -6-

3,720,569
ENDLESS REINFORCEMENT AND METHOD
FOR PRODUCING SAME
Victor W. Kimble, Spartanburg, S.C., assignor to Deering
Milliken Research Corporation, Spartanburg, S.C.
Filed Dec. 14, 1970, Ser. No. 97,715
Int. Cl. B32b 5/12
U.S. Cl. 161—57                                                      19 Claims

ABSTRACT OF THE DISCLOSURE

An endless reinforcement which comprises a unitary strip including a multiplicity of continuous cords, the strip forming a generally zigzag pattern and being positioned across the width of the reinforcement from one side to the other at an angle to the edges of the reinforcement with a turn at each edge about an axis substantially perpendicular to the major plane of the strip. Also, a method for producing such a reinforcement and a tire therewith as well as the resulting tire.

---

The tire industry recently has developed considerable interest in tire constructions which include an annular reinforcement belt or breaker about the periphery of the tire between the tread and the carcass. Such belted tires have the advantage of better road stability and longer tread life both in radial and bias ply constructions.

The reinforcements generally are formed of inextensible thread or cord coated with or embedded in a suitable insulating material such as rubber, plastic or some other resinous material. The cords usually are disposed in a pattern in which portions thereof extend in different directions to each other and in directions biased with respect to the longitudinal axis of the reinforcement. This may be accomplished by bias cutting woven fabric which has been calendered with a layer of unvulcanized rubber. Since such reinforcements of necessity are spliced and have a large number of cut ends at each edge of the belt, it has been proposed to form reinforcements by winding one or more continuous lengths of cord onto a rotating drum while employing a reciprocating guide to traverse the drum surface and to lay the cord in a generally zigzag pattern thereon. Examples of such belts are disclosed in U.S. Patents Nos. 2,982,327 and 3,422,874.

Prior to the application of the cord to the surface, the cord may be coated or wrapped with an unvulcanized rubber coating which is quite tacky to provide a pressure sensitive adhesive affinity between adjacent cords and also to separate the cords. However, even with this rubber separation, under certain conditions cord to cord contact may be produced during the formation of the reinforcement and/or tire. This is particularly undesirable with metal wire and also with fiber glass which is the present industry-accepted material for use in such reinforcements. It is well known that these cords severely abrade when adjacent threads or cords are rubbed or impacted against one another.

The present invention provides a novel endless reinforcement for tires, drive belts and the like which has advantages and benefits over known reinforcements. Also, the invention provides a novel method for producing such reinforcements and tires therewith.

The endless reinforcement of the present invention comprises a unitary strip or ribbon including a multiplicity of continuous cords with the strip forming a generally zigzag pattern and being positioned across the width of the reinforcement from one side to the other at an angle to the edges of the reinforcement with a turn at each edge about an axis substantially perpendicular to the major plane of the strip. With such turns, the strip is not folded at the edges but instead has the same surface facing the outside of the reinforcement throughout its length. Such a construction may provide a reinforcement with tapered or feathered edges because of the single layer scallops or curves at either side of the reinforcement.

The endless reinforcement usually is of a generally cylindrical form or configuration and is made from conventional tire cord materials such as fiber glass, rayon, polyester, nylon, cotton, metal wire and similar type cords, although the benefits and advantages of the invention are particularly apparent with materials such as fiber glass, metal wire, etc., which are easily abraded or degraded by cord to cord contact. The dimensions of the reinforcement may be varied over a considerable range depending upon the ultimate use thereof. For example, with reinforcements which are to be applied to tire carcasses in flat band form, the circumference will be considerably smaller than the final circumference in the finished tire. Likewise, the original width will be substantially larger than the final width. This is due to the fact that during the expansion step in the forming of the tire, the circuference of the reinforcement generally will be substantially increased and the width will be significantly reduced. During this expansion, the angle of the cord across the width of the reinforcement from one side to the other as measured from the edge will usually be reduced substantially. With reinforcements which are applied to a carcass that has already been formed into the shape of a torus, i.e., a doughnut shape similar to that of the final tire, the dimensions will be about the same in the original form as applied to the carcass and in the final size in the finished tire.

As pointed out above, the endless reinforcement of the invention is formed from a unitary strip including a multiplicity of continuous cords associated with rubber, plastic or a similar material. Although the configuration of the strip generally is rectangular with the cords in a single plane and equally spaced from each other, the cords may be unequally spaced and/or disposed in more than one plane. Also, the cords may be of different sizes or different materials, e.g., the end cords may be rayon with the intermediate cords being metal wires or other combinations of different cords. Likewise, heavier rubber coatings may be used at certain portions across the width of the strip or along the length thereof as desired. While the strip generally will have a smooth outer rubber surface, indentations or openings through the strip may be utilized.

The strip advantageously is formed by passing a plurality of cords in the desired spaced relationship through an extruder, although other methods may be employed. For example, a number of parallel cords or a cord fabric may be calendered with rubber and then slit into strips of the desired width. In addition, the strip may be formed by coating a plurality of cords with a rubber latex in a multiple dip operation to form a unitary strip. Prior to the formation of the reinforcement, the rubber of the strip may be partially or totally vulcanized.

The width of the strip may vary over a considerable range and generally is between about ½ and 2½ inches and preferably between about 1 and 2 inches to facilitate convenient handling and reinforcement construction. The particular width selected will depend upon belt size and the reinforcement pattern desired. For example, with some applications such as large off-the-road machinery, the strip width may be up to 6 inches or more.

The employment of the unitary strip permits closer cord spacing than is ordinarily attainable when reinforcements are made from single cords. Thus, cord spacing of about 18 to 30 or 40 cords per inch of strip width may be employed, depending upon cord size, without cord to cord contact occurring in the reinforcement. However, wider cord spacing of 10 cords per inch or less may be advantageous under some conditions.

The strip is positioned across the width of the reinforcement from one side to the other at an angle to the edges in the zigzag pattern. With reinforcements intended to be expanded, the initial angle of the strip and the cord therein is generally in the range of about 50° to 80° and preferably about 50° and 60° as measured from an edge of the reinforcement. During expansion, the angle of the strip and cord usually will be reduced to an angle in the range of about 5° to 35°. With a reinforcement which is applied to a carcass after the carcass has been expanded, the angle is generally in the range of about 5° to 35°. It may be desirable with certain constructions to provide a change in the angle of the strip and/or cord across the width of the reinforcement. Such a construction may be advantageous where different reinforcement expansion characteristics are desired for particular shapes or types of tires.

As pointed out above, in the reinforcement of the invention, the strip is turned at the edges of the reinforcement. The turn may be a simple curve about a single axis or may be a more complex curve, for example, one in which the strip extends along the edge between portions of the turn. Upon turning of the strip, the succeeding length of the strip is positioned in the zigzag pattern at approximately the same angle with respect to one edge as the previous length of strip prior to the turn is with respect to the opposite edge. This provides a symmetrical cord position in the final reinforcement and minimizes the possibility of imbalance in the tire. If desired, the strip can be preconditioned, e.g., the zigzag pattern preformed prior to the formation of the endless reinforcement.

With certain reinforcement designs, it may be desirable to form the reinforcement from more than one strip with each strip being of the same or different width and length. This facilitates the production of a reinforcement in a shorter period of time and/or produces a reinforcement with a different pattern. Such patterns may be desired to produce belts having particular characteristics such as a higher degree of symmetry and the like.

The endless reinforcement of the invention preferably is formed by positioning two unitary strips in substantially mirror image disposition with respect to a plane circumferentially bisecting the reinforcement. Thus, transversely disposed points on corresponding strip lengths are located substantially equidistant from the edges of the reinforcement and from the bisecting plane. With certain strip patterns, one strip may be positioned in a more forward or rearward position circumferentially for proper disposition of the strips in the finished reinforcement. In such multi-strip belts the summation of the areas in which cords are disposed at one angle is substantially equal to the summation of the areas in which cords are disposed at an opposing angle for a full width portion of the outer surface of the reinforcement constituting between about 5% and 15% of the total outer surface area.

The strip may be associated with a green or unvulcanized rubber layer to form the reinforcement. This may be accomplished by forming the strip in its generally zigzag pattern over the surface of such a rubber layer or band. Also, a rubber layer may be placed over the outer surface instead of or together with a second rubber layer on the inside thereof. It may be desirable in some constructions to provide rubber shoulder portions adjacent the edges of the reinforcement. Such shoulder portions can be used alone or in combination with one or more rubber layers. The shoulder portions assist in the elimination of entrapped air and in the positioning of the reinforcement with respect to the carcass so that the edges will be properly disposed in the final tire in relation to the center portion of the reinforcement. Such shoulder portions are particularly useful in the production of tires in which it is desirable that the reinforcement be disposed equidistant from the tread surface at all points across the width thereof.

The reinforcement of the invention made with a unitary strip containing a multiplicity of cords provides a novel structure with a reduced number of cross-overs, that is, points at which a cord transfers from one surface of the reinforcement to another, adjoining a cord transferred in the opposite direction. This reduction in cross-overs is particularly important in reinforcements employing cord elements which may be damaged by cord to cord contact. A further advantage of the structure of the invention is that the transfer of the strip from one surface of the reinforcement to the other does not result in any significant thickening of the belt cross section as may occur with single cord reinforcements. Also, the use of a unitary strip decreases the production time for a reinforcement as compared with single cord constructions. In addition, the cord spacing may be significantly decreased without increasing production time.

The invention will be further illustrated with reference to the accompanying drawings, in which:

FIG. 1 is a schematic illustration of one embodiment of an endless reinforcement of the invention showing a portion of the strip pattern of the outer surface and the cord direction within the strips;

FIG. 2 is a schematic illustration of a portion of the pattern of the partially formed reinforcement of FIG. 1;

FIG. 3 is a schematic illustration of another embodiment of an endless reinforcement of the invention showing a portion of a two strip pattern of the outer surface and the cord direction within the strips;

FIG. 4 is a schematic illustration of a portion of the pattern of the partially formed reinforcement of FIG. 3;

FIG. 5 is a fragmentary schematic view of a tire including an endless reinforcement of the invention; and FIG. 6 is a schematic illustration of one form of apparatus for forming an endless reinforcement of the invention.

Portions of typical endless reinforcements in accordance with the invention are shown in FIGS. 1–5 of the drawings. The reinforcement 10 illustrated in FIGS. 1 and 2 is similar to the reinforcement 20 shown in FIGS. 3 and 4 except that reinforcement 10 is formed with a single strip while reinforcement 20 is formed with two strips. As shown in FIGS. 1 and 2, a strip 11 is disposed in a zigzag repeating pattern with succeeding lengths of the strip being displaced from each other. The turns or reversals 12 at the edges of the reinforcement are also clearly seen from these figures.

FIG. 3 and 4 show strips 21 and 22 disposed in a zigzag repeating pattern with succeeding lengths of the strips being displaced from the preceding ones. The turns or reversals 23 and 24 form the edges of the reinforcement. The starting positions of the strips 21 and 22 are located at points along the edges of the reinforcement which are disposed transversely across the width of the reinforcement. Likewise, succeeding turns of each strip are disposed transversely with respect to each other.

In FIG. 5 showing a tire including a reinforcement of the invention, the reinforcement 26 is disposed within the tire between the tread 27 and the carcass plies 28.

As shown in FIG. 6, one form of apparatus for forming the reinforcement of the invention includes a rotatable winding drum 31 having a generally cylindrical outer surface 32 providing a supporting surface for cord strip 30 to be positioned thereon. Associated with the drum 31 is guide means 33 mounted for movement on rod 34 for laying strip 30 in a desired zigzag pattern on drum surface 32. Drum 31 and guide means 33 are driven by a power source shown as motor 35. Motor 35 is drivingly connected through a belt and pulley arrangement 36 to a rotatable shaft 37. Shaft 37 is connected to a barrel cam 38 and to drive shaft 39 for drum 31 through a suitable gear train 40. A cam follower 42 connected to the strip guide 33 engages a groove 38a in the surface of cam 38. Groove 38a is of such a configuration that during rotation of the winding drum 31, guide 33 reciprocates across drum surface 32 transversely to the direction of drum rotation so that strip 30 is laid in a zigzag pattern over surface 32, the strip being turned at the edges of the reinforcement.

Gear train 40 includes a gear mechanism 43 to control the positioning of the strip on drum surface 32 during the subsequent rotation of the drum 31 so the strip being laid on the surface is in a predetermined position with respect to other strip lengths. This control of the strip lay-down provides for the achievement of the desired pattern in the reinforcement and provides for the formation of a complete reinforcement, i.e., a belt in which the strip spacing and configuration is substantially uniform and in accordance with the preselected pattern.

In a preferred procedure for forming a reinforcement of the invention employing the apparatus shown in FIG. 6, winding drum 31 is continuously rotated to draw a unitary strip 30 including a multiplicity of tire cords (not shown) over a guide 33 and onto drum surface 32. Simultaneously, the guide 33 reciprocates with respect to the surface of the drum 31 to lay the strip in a zigzag pattern on the surface thereof. As guide 33 approaches an edge of the drum surface, the movement of the guide is reversed by the cam 38 to turn the strip and provide a reversal of the strip pattern across the surface 32 in an opposite direction. The relationship of the speed of rotation of the drum 31 with respect to the movement of guide means 33 determines the strip pattern of the reinforcement. The winding of the strip on the surface is continued until the pattern is completed. In this way an endless reinforcement is formed from a continuous strip.

The invention will be described in greater detail with reference to the following examples which are intended to illustrate the invention without restricting the scope thereof.

EXAMPLE I

A reinforcement for a radial ply tire is made on apparatus as shown in FIG. 6 employing the following procedure. The circumference of the reinforcement is about 80 inches and the width thereof is 6.2 inches. The angle of the strip is 29°. A belt as shown in FIG. 1 of the drawings is formed by winding a rubber coated cord strip 1.56 inches wide and 0.058 inch thick containing 34 brass plated steel cords about 0.024 inch in diameter, 7 revolutions of the drum with 3 4/7 cycles of the cord guide per drum revolution, one cycle being a return to the original position. The endless reinforcement is applied to a torus shaped tire carcass and tread and sidewall-forming rubber stock is place over the breaker. The resulting assembly is molded under heat and pressure and vulcanized to form a tire.

EXAMPLE II

The procedure of this example is the same as that of Example I except that two traversing strip guides are employed to form a belt similar to that shown in FIG. 3 from two rubber covered cord strips each 0.70 inch wide and 0.058 inch thick containing 16 brass plated steel cords 0.024 inch in diameter. After 7 drum revolutions with 4 2/7 cycles of the cord guides per revolution, a reinforcement is formed having a circumference of about 80 inches and a width of 5.7 inches with a strip angle of 31.5°. The resulting reinforcement is applied to a torus shaped carcass and a tire made according to the procedure of Example I.

EXAMPLE III

To produce a reinforcement for a bias ply tire, the procedure of Example I is repeated except that a rubber coated cord strip 1.38 inches wide and 0.065 inch thick is wound at an angle of 60° on a 48 inch circumference drum. The strip contains 24 brass plated steel cords about 0.030 inch in diameter. A belt similar to that shown in FIG. 1 of the drawings is formed after 7 revolutions of the drum with 4 2/7 cycles of the cord guide per revolution. The endless reinforcement having a width of 9.7 inches is applied to a flat band tire carcass and tread and sidewall-forming rubber stock is applied over the belt. The flat band assembly is shaped in the form of a torus under heat and pressure and vulcanized to form a tire. During the shaping process, the circumference of the reinforcement is increased to about 74 inches and the width thereof reduced to about 5 inches. The cord angle is about 24° as measured from an edge.

EXAMPLE IV

The procedure of this example is the same as that of Example II except that a belt similar to that shown in FIG. 3 for a bias ply tire is formed from two rubber covered cord strips each 0.94 inch wide and 0.065 inch thick containing 15 brass plated steel cords about 0.030 inch in diameter. After 5 drum revolutions with 4 2/5 cycles of the cord guides per revolution, a belt having a circumference of about 48 inches, a width of about 9.45 inches and a strip angle of about 60° is formed. The resulting reinforcement is applied to a flat band carcass and a tire made according to the procedure of Example III.

EXAMPLE V

A reinforcement for incorporation in a retread truck tire is formed by following the procedure of Example II employing two rubber covered cord strips each 1.75 inches in width and 0.070 inch in thickness containing 26 brass plated steel cords 0.032 inch in diameter. After 4 drum revolutions with 3 3/4 cycles of the cord guides per revolution, a reinforcement about 120 inches in circumference and 7.8 inches in width with a strip angle of 26° is formed. This reinforcement is used in a tire retreading operation by applying the reinforcement over a tire from which the worn tread has been buffed. Thereafter, tread stock is applied over the belt and the assembly is vulcanized to form the retread tire.

The above description, drawings and examples show that the present invention provides a novel reinforcement for a pneumatic tire which overcomes the disadvantages of bias-cut fabric reinforcements and the problems of endless cord reinforcements heretofore known. The construction of the reinforcement of the invention substantially eliminates cord to cord contact during manufacture and use which can result in premature tire failure. The reinforcement of the invention provides a high degree of flexibility in useful configurations and dimensions and can provide a structure with feathered or tapered edges. Furthermore, the reinforcement of the invention is useful both for new tires and for retread tires. For new tires the reinforcement of the invention is not only useful in radial ply tires where the reinforcement is applied after the carcass is shaped into the form of a torus, but also the belt is particularly suitable for use in bias ply tires made by flat band building methods in which the reinforcement is applied to the carcass in flat band form and expanded during the carcass shaping procedure. A further advantage of the reinforcement of the invention is the high degree of balance and symmetry which can be achieved in tires incorporating the reinforcement. This is due to the fact that the reinforcement is without a splice and also that the reinforcement does not contain separate plies which can create significant shear planes and transverse forces or side-thrust in a running tire.

While the above description has been directed primarily to an endless reinforcement for various types of tires it will be apparent that the present invention may be utilized to provide reinforcements for other endless reinforced products such as drive belts, conveyor belts, snowmobile belts and similar products. Also, the reinforcement of the invention is useful for the production of other cord components of a tire, for example, for the carcass itself or for a unitized breaker/carcass assembly. The reinforcement can be wound over a carcass or applied thereto in flat band form and expanded, e.g., to produce a belted bias ply tire, or wound over or applied to an expanded carcass such as in the production of a radial ply tire. Furthermore, the reinforcement can be used with a tire from which the tread has been removed, new tread stock applied and vulcanized to form a retread tire.

It will be apparent to one skilled in the art that various modifications and variations in the procedures, materials and apparatus can be made within the scope of the invention. For example, while a single reinforcement will generally replace a conventional two-ply breaker belt, more than one reinforcement or a reinforcement of extra thickness may be advantageous in certain applications. Therefore, the foregoing description, drawings and examples are intended to illustrate the preferred embodiments of the invention, and the scope of the invention is to be limited only by the following claims.

That which is claimed is:

1. An endless reinforcement of substantially uniform thickness which comprises a unitary strip including a multiplicity of continuous cords surrounded and separated by rubber, the strip forming a generally zigzag pattern and being positioned across the width of the reinforcement in substantially straight lengths from one side to the other at an angle to the edges of the reinforcement with a short turn at each edge about an axis substantially perpendicular to the major plane of the strip, the cords of said unitary strip being in contiguous relationship throughout the entire length of said unitary strip.

2. An endless reinforcement according to claim 1 wherein the turns are generally smooth curves.

3. An endless reinforcement according to claim 1 wherein the cords are metal wire.

4. An endless reinforcement according to claim 1 wherein the reinforcement comprises more than one strip.

5. An endless reinforcement according to claim 4 wherein the summation of the areas in which cords are disposed at one angle is substantially equal to the summation of the areas in which cords are disposed at an opposing angle for a full width portion of the outer surface of the reinforcement constituting between about 5% and 15% of the total outer surface area.

6. An endless reinforcement according to claim 1 wherein the width of the strip is between about one half and six inches.

7. An endless reinforcement according to claim 1 wherein the width of the strip is between about one half and two and one half inches.

8. An endless reinforcement according to claim 1 wherein the cords within the unitary strip are disposed in a single plane.

9. An endless reinforcement according to claim 1 wherein the strip is disposed at an angle between about 5° and 35° as measured from an edge of the reinforcement.

10. An endless reinforcement according to claim 1 wherein the strip is disposed at an angle between 5° and 35° as measured from an edge of the reinforcement.

11. An endless reinforcement according to claim 1 wherein the rubber of the strip is at least partially vulcanized.

12. A method of producing an endless reinforcement which comprises positioning a unitary strip including a multiplicity of continuous cords, in a generally zigzag pattern across the width of said reinforcement in substantially straight lengths from one side to the other at an angle to the edges of the reinforcement and turning the strip in a short turn adjacent each edge about an axis substantially perpendicular to the major plane of the strip to form a reinforcement of substantially uniform thickness with the cords of said unitary strip being in contiguous relationship throughout the entire length of said unitary strip.

13. A method according to claim 12 wherein said unitary strip is formed by associating rubber with said continuous cords.

14. A method according to claim 13 wherein the rubber of the strip is at least partially vulcanized.

15. A method according to claim 12 wherein more than one strip is employed to form the reinforcement.

16. A method according to claim 15 wherein the strips are positioned in substantially mirror image relationship to a circumferentially bisecting plane through said reinforcement.

17. A method according to claim 12 wherein the strip is positioned across the width of the reinforcement at an angle between about 50° and 80° as measured from an edge of the reinforcement.

18. A method according to claim 12 wherein the strip is positioned across the width of the reinforcement at an angle between about 5° and 35° as measured from an edge of the reinforcement.

19. A tire including the endless reinforcement of claim 1.

References Cited

UNITED STATES PATENTS

| | | | |
|---|---|---|---|
| 3,589,426 | 6/1971 | Varner | 152—361 |
| 3,024,829 | 3/1962 | Cooper | 152—361 |
| 3,422,874 | 1/1969 | Weitzel | 152—361 |
| 2,982,327 | 5/1961 | Vanzo et al. | 152—361 |
| 3,024,828 | 3/1962 | Smith et al. | 152—361 |
| 3,563,296 | 2/1971 | Wells | 152—361 |

WILLIAM A. POWELL, Primary Examiner

J. J. BELL, Assistant Examiner

U.S. Cl. X.R.

152—361; 156—123, 175, 181, 433; 161—58, 144